(12) United States Patent
Aoki et al.

(10) Patent No.: US 9,458,293 B2
(45) Date of Patent: Oct. 4, 2016

(54) METHOD FOR PRODUCING COMPOSITION FOR OPTICAL MATERIAL

(71) Applicant: MITSUBISHI GAS CHEMICAL COMPANY, INC., Tokyo (JP)

(72) Inventors: Takashi Aoki, Osaka (JP); Hirohito Ishizuka, Ibaraki (JP); Eiji Koshiishi, Chiba (JP); Motoharu Takeuchi, Ibaraki (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 14/372,153

(22) PCT Filed: Jan. 30, 2013

(86) PCT No.: PCT/JP2013/051970
§ 371 (c)(1),
(2) Date: Jul. 14, 2014

(87) PCT Pub. No.: WO2013/115212
PCT Pub. Date: Aug. 8, 2013

(65) Prior Publication Data
US 2014/0378628 A1    Dec. 25, 2014

(30) Foreign Application Priority Data
Feb. 2, 2012  (JP) ................ 2012-021022

(51) Int. Cl.
*C08F 283/00* (2006.01)
*C08G 75/28* (2006.01)
*C08G 75/08* (2006.01)
*G02B 1/04* (2006.01)

(52) U.S. Cl.
CPC ............ *C08G 75/28* (2013.01); *C08G 75/08* (2013.01); *G02B 1/04* (2013.01)

(58) Field of Classification Search
CPC .......... C08G 75/08; G02B 1/04; C08L 81/00
USPC ...................................... 528/375
See application file for complete search history.

(56) References Cited

U.S. PATENT DOCUMENTS

| 5,807,975 A | 9/1998 | Amagai et al. |
| 6,531,532 B1 | 3/2003 | Yoshimura et al. |
| 2004/0024165 A1 | 2/2004 | Yoshimura et al. |
| 2004/0122201 A1 | 6/2004 | Yoshimura et al. |
| 2004/0254258 A1 | 12/2004 | Horikoshi et al. |
| 2009/0018308 A1 | 1/2009 | Kamura et al. |
| 2009/0156781 A1 | 6/2009 | Ihara et al. |
| 2010/0004421 A1 | 1/2010 | Horikoshi et al. |
| 2010/0010192 A1* | 1/2010 | Kawaguchi et al. ......... 528/374 |
| 2012/0010361 A1* | 1/2012 | Urakawa et al. ......... C08F 2/44 524/730 |
| 2012/0142889 A1 | 6/2012 | Aoki et al. |
| 2013/0068299 A1* | 3/2013 | Okaniwa et al. ............. 136/257 |

FOREIGN PATENT DOCUMENTS

| CN | 101495531 A | 7/2009 |
| EP | 1319966 A1 | 6/2003 |
| JP | 09-110979 | 4/1997 |
| JP | 2001-002783 | 1/2001 |
| JP | 2002-122701 | 4/2002 |
| JP | 2004-137481 | 5/2004 |
| JP | 2004-339329 | 12/2004 |
| JP | 2007-093862 | 4/2007 |
| JP | 2009-144094 | 7/2009 |
| JP | 2009-242532 | 10/2009 |
| JP | 2012-233044 | 11/2012 |
| KR | 10-2008-0007562 | 1/2008 |
| WO | 2010/073613 | 7/2010 |
| WO | 2010/131631 | 11/2010 |
| WO | 2012/147708 | 11/2012 |

OTHER PUBLICATIONS

Search report from International Search Report in PCT/JP2013/051970, mailed Apr. 23, 2013.
European Search report issued with respect to application No. 13742825.6, mail date is Aug. 12, 2015.

* cited by examiner

*Primary Examiner* — Shane Fang
(74) *Attorney, Agent, or Firm* — Greenblum & Bernstein, P.L.C.

(57) ABSTRACT

According to the present invention, a composition for optical material, which is capable of providing a homogeneous optical material, can be prepared through pre-polymerization reaction between (a) an inorganic compound having a sulfur atom and (b) an episulfide compound using a hindered amine as a catalyst, followed by mixing with (c) a polythiol compound and (d) a polyisocyanate compound. Moreover, this composition for optical material can be polymerized and cured to thereby provide an optical material having high refractive index (ne of 1.73 or higher), high strength (an elongation of 13% or more in three-point bend test and good drilling resistance), and high heat resistance (a softening point of 70° C. or higher, as measured by TMA).

6 Claims, No Drawings

METHOD FOR PRODUCING COMPOSITION FOR OPTICAL MATERIAL

TECHNICAL FIELD

The present invention relates to a composition for optical material, and further relates to an optical material (optical resin material) comprising the same, including a plastic lens, a prism, an optical fiber, an information recording substrate, a filter and so on. The optical material of the present invention is preferred for use as a plastic lens, particularly a spectacle lens for a rimless frame.

BACKGROUND ART

Plastic materials are light in weight and excellent in toughness, and are easy to dye. Due to these properties, plastic materials have been frequently used for various types of optical materials, particularly spectacle lenses, in recent years. Performance required for optical materials, particularly optical materials for spectacle lenses, includes physical properties such as low specific gravity, chemical and thermal properties such as low yellowness index and high heat resistance, as well as mechanical properties such as high strength and so on, while the required optical performance includes high transparency, high refractive index and high Abbe's number. High refractive index allows a reduction in lens thickness, while high Abbe's number reduces chromatic aberration in lenses. However, higher refractive index gives lower Abbe's number, so that attempts have been made to improve both refractive index and Abbe's number. Among these attempts, typically listed are processes using an episulfide compound as shown in Patent Document 1. Also, there has been proposed an optical material having a refractive index of 1.73 or higher, which is composed of a polyepisulfide compound and an inorganic compound, as shown in Patent Documents 2 and 3.

On the other hand, lenses which have become thinner due to high refractive index are required to have high strength more than ever before in terms of safety, etc. For example, when applied to a frame which is called a rimless frame, the lenses should be drilled to make holes and hence are required to have enough strength not to generate cracks and/or breaks during drilling. Moreover, to withstand use in a rimless frame, the lenses are required to have enough strength not to be broken even when the frame is bent. At the same time, the lenses are also required to have heat resistance, because it is routine to provide plastic lenses with hard coating for surface protection and heat should be applied during such hard coating formation.

Against this backdrop, attempts have been made to satisfy three requirements, i.e., high refractive index, high strength and heat resistance at the same time. Among these attempts, typically listed are processes using the following four compounds: a compound having an episulfide group, an inorganic compound having a sulfur atom and/or a selenium atom, a thiol compound forming a thiourethane bond, and an isocyanate compound, as shown in Patent Documents 4 and 5. In addition, to obtain a homogeneous and transparent optical material having a refractive index of 1.73 or higher, it is known that an inorganic compound having a sulfur atom and/or a selenium atom and a compound having an episulfide group are subjected to pre-polymerization reaction. When a thiol compound and an isocyanate compound are each added to this pre-polymerization reaction product, rapid polymerization will occur, so that any homogeneous and transparent optical material cannot be obtained or only an optical material of very thin thickness can be obtained. In Patent Document 5, a product of pre-polymerization reaction between a thiol compound and an isocyanate compound is added to the above pre-polymerization reaction product to thereby avoid rapid polymerization, although the resulting casting composition is highly viscous and therefore difficult to cast.

Thus, in the preparation processes shown in the above documents which cause rapid polymerization or generate a highly viscous product, it has been difficult to practically prepare an optical material having a refractive index of 1.73 or higher, which is composed of the following four components: an inorganic compound having a sulfur atom and/or a selenium atom, an episulfide compound, a thiol compound and an isocyanate compound. For this reason, there has been a demand for the development of a process for producing a lens which has a refractive index of 1.73 or higher and is provided with strength and heat resistance.

PRIOR ART DOCUMENTS

Patent Documents

Patent Document 1: Japanese Patent Laid-open Publication No. H09-110979
Patent Document 2: Japanese Patent Laid-open Publication No. 2001-002783
Patent Document 3: Japanese Patent Laid-open Publication No. 2004-137481
Patent Document 4: Japanese Patent Laid-open Publication No. 2002-122701
Patent Document 5: Japanese Patent Laid-open Publication No. 2004-339329

SUMMARY OF THE INVENTION

Problem to be Solved by the Invention

The problem to be solved by the present invention is to provide a practicable optical material which satisfies the following three requirements at the same time: high refractive index (ne of 1.73 or higher), high strength (an elongation of 13% or more in three-point bend test and good drilling resistance), and high heat resistance (a softening point of 70° C. or higher, as measured by TMA).

Means to Solve the Problem

Under these circumstances, the inventors of the present invention have repeated extensive and intensive efforts. As a result, the inventors of the present invention have found a method for producing a composition for optical material, which is less viscous and does not cause rapid gelation, by using a hindered amine compound as a catalyst for pre-polymerization reaction in cases where a composition comprising four types of compounds, i.e., a compound having an episulfide group, an inorganic compound having a sulfur atom, a thiol compound forming a thiourethane bond, and an isocyanate compound is cured into an optical material. This finding led to the completion of the present invention. Namely, the present invention is as follows.

[1]: A method for producing a composition for optical material, starting from 10 to 50 parts by mass of the following compound (a) (provided that it is 10% by mass or more relative to the total mass of the composition for optical material), 50 to 90 parts by mass of the following compound (b), 1 to 50 parts by mass of the following compound (c), and 1 to 50 parts by mass of the following compound (d) (provided that it is 1% by mass or more relative to the total mass of the composition for optical material) (provided that all parts by mass are calculated assuming that the sum of the compound (a) and the compound (b) is set to 100 parts by mass), wherein the method comprises pre-polymerization reaction between the following compound (a) and the following compound (b) using a hindered amine as a catalyst, and mixing the resulting reaction mixture with the following compound (c) and the following compound (d):
  (a) an inorganic compound having a sulfur atom;
  (b) an episulfide compound having one or more episulfide groups per molecule;
  (c) a thiol compound having one or more mercapto groups per molecule; and
  (d) an isocyanate compound having one or more isocyanate groups per molecule.

[2]: The method for producing a composition for optical material according to [1] above, wherein the hindered amine is 1,2,2,6,6-pentamethylpiperidyl-4-methacrylate.

[3]: A method for producing an optical material, which comprises the steps of: preparing a composition for optical material by the method for producing a composition for optical material according to [1] or [2] above; and polymerizing and curing the resulting composition for optical material.

[4]: An optical material obtainable by the method according to [3] above, which has a refractive index (ne) of 1.73 or higher.

[5]: A spectacle lens, which comprises the optical material according to [4] above.

[6]: The spectacle lens according to [5] above, which has enough strength to be applicable to a rimless frame.

Effects of the Invention

The present invention enables the provision of a composition for optical material, which allows the resulting optical material to have high refractive index (ne of 1.73 or higher), high strength (an elongation of 13% or more in three-point bend test and good drilling resistance), and high heat resistance (70° C. or higher, as measured by TMA), as well as an optical material obtainable by curing such a composition, and a rimless frame spectacle lens comprising such an optical material.

EMBODIMENTS FOR CARRYING OUT THE INVENTION

1. Method for Producing a Composition for Optical Material

The method of the present invention for producing a composition for optical material starts from (a) an inorganic compound having a sulfur atom (hereinafter referred to as compound (a)), (b) an episulfide compound having one or more episulfide groups per molecule (hereinafter referred to as compound (b)), (c) a thiol compound having one or more mercapto groups per molecule (hereinafter referred to as compound (c)), and (d) an isocyanate compound having one or more isocyanate groups per molecule (hereinafter referred to as compound (d)). Moreover, (e) a hindered amine compound (hereinafter referred to as compound (e)) is used as a catalyst for pre-polymerization reaction between the compound (a) and the compound (b).

In addition, optional components such as a polymerization catalyst, a polymerization regulator, a performance improver and so on are further used when required.

(1) Compound (a)

The compound (a) to be used in the present invention, which is an inorganic compound having a sulfur atom, encompasses all inorganic compounds having one or more sulfur atoms. In the compound (a), the ratio of the total mass of sulfur atom(s) is preferably 30% by mass or more of the compound. If this ratio is less than 30% by mass, the resulting composition for optical material will have a smaller increment in the ratio of the mass of sulfur atom(s) therein, which in turn will reduce the effect of achieving high refractive index in the resulting optical material. The amount of the compound (a) to be used is 10 to 50 parts by mass, preferably 10 to 40 parts by mass, and more preferably 10 to 30 parts by mass, assuming that the sum of the compounds (a) and (b) is set to 100 parts by mass.

However, to ensure that the optical material obtained from this composition for optical material has a refractive index (ne) of 1.73 or higher, the amount of the compound (a) is set to at least 10% by mass or more, relative to the total mass of the composition for optical material.

Specific examples of such an inorganic compound having a sulfur atom include sulfur, hydrogen sulfide, carbon disulfide, carbon selenosulfide, ammonium sulfide, sulfur oxide (e.g., sulfur dioxide, sulfur trioxid), a thiocarbonate salt, sulfuric acid and a salt thereof, a hydrogen sulfate salt, a sulfite salt, a hyposulfite salt, a persulfate salt, a thiocyanate salt, a thiosulfate salt, a halide (e.g., sulfur dichloride, thionyl chloride, thiophosgene), boron sulfide, nitrogen sulfide, silicon sulfide, phosphorus sulfide, arsenic sulfide, a metal sulfide, a metal hydrosulfide and so on. Among these, preferred are sulfur, carbon disulfide, phosphorus sulfide, selenium sulfide, a metal sulfide and a metal hydrosulfide, more preferred are sulfur, carbon disulfide and selenium sulfide, and particularly preferred is sulfur.

These inorganic compounds having a sulfur atom may be used either alone or in any combination.

(2) Compound (b)

The compound (b) to be used in the present invention encompasses all episulfide compounds having one or more episulfide groups per molecule. However, preferred are compounds having two episulfide groups per molecule, as specifically exemplified by one or more episulfide compounds selected from the group consisting of bis(β-epithiopropyl)sulfide, bis(β-epithiopropyl)disulfide, bis(β-epithiopropyl)trisulfide, bis(β-epithiopropylthio)methane, 1,2-bis(β-epithiopropylthio)ethane, 1,3-bis(β-epithiopropylthio)propane, 1,2-bis(β-epithiopropylthio)propane, 1,4-bis(β-epithiopropylthio)butane and bis(β-epithiopropylthioethyl)sulfide. These compounds may be used either alone or in any combination.

Among them, preferred specific examples are bis(β-epithiopropyl)sulfide (Formula (1)) and/or bis(β-epithiopropyl)disulfide (Formula (2)), and the most preferred specific example is bis(β-epithiopropyl)sulfide.

[Formula 1]

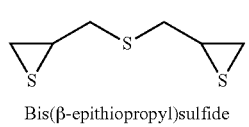

Bis(β-epithiopropyl)sulfide (1)

[Formula 2]

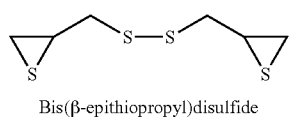

Bis(β-epithiopropyl)disulfide

The compound (b) to be used in the present invention is added in an amount of 50 to 90 parts by mass, preferably 60 to 90 parts by mass, and more preferably 70 to 90 parts by mass, assuming that the sum of the compounds (a) and (b) is set to 100 parts by mass.

(3) Compound (c)

The compound (c) to be used in the present invention encompasses all thiol compounds having one or more mercapto groups per molecule. However, preferred are compounds having two or more mercapto groups per molecule, as specifically exemplified by one or more members selected from polythiol compounds such as m-xylylenedithiol, p-xylylenedithiol, o-xylylenedithiol, bis(2-mercaptoethyl)sulfide, pentaerythritol tetrakis(2-mercaptoacetate), pentaerythritol tetrakis(3-mercaptopropionate) and 1,2-bis(2-mercaptoethylthio)-3-mercaptopropane. These compounds may be used either alone or in any combination.

Among them, preferred are those represented by the following structural formulae, i.e., m-xylylenedithiol (Formula (3)) and p-xylylenedithiol (Formula (4)), as well as pentaerythritol tetrakis(3-mercaptopropionate) and 1,2-bis(2-mercaptoethylthio)-3-mercaptopropane, and particularly preferred is m-xylylenedithiol which is in a liquid state of low viscosity at atmospheric temperature.

[Formula 3]

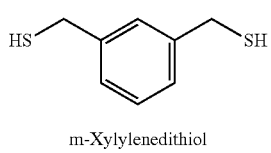

m-Xylylenedithiol

[Formula 4]

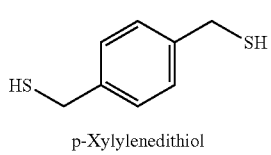

p-Xylylenedithiol

The compound (c) to be used in the present invention is preferably added in an amount of 1 part by mass to 50 parts by mass, more preferably 2 parts by mass to 30 parts by mass, and even more preferably 5 parts by mass to 15 parts by mass, assuming that the sum of the compounds (a) and (b) is set to 100 parts by mass.

(4) Compound (d)

The compound (d) to be used in the present invention encompasses all isocyanate compounds having one or more isocyanate groups per molecule. However, preferred are compounds having two isocyanate groups per molecule, as specifically exemplified by one or more members selected from diisocyanate compounds such as a xylylene diisocyanate compound, 1,3-bis(isocyanatomethyl)cyclohexane, isophorone diisocyanate and hexamethylene diisocyanate. These compounds may be used either alone or in any combination.

Among them, preferred are m-xylylene diisocyanate represented by the following structural formula (Formula (5)), as well as 1,3-bis(1-isocyanate-1-methylethyl)benzene and 1,3-bis(isocyanatomethyl)cyclohexane.

[Formula 5]

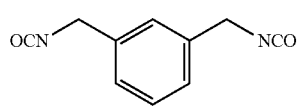

m-Xylylene diisocyanate

The compound (d) to be used in the present invention is preferably added in an amount of 1 part by mass to 50 parts by mass, more preferably 2 parts by mass to 30 parts by mass, and even more preferably 3 parts by mass to 10 parts by mass, assuming that the sum of the compounds (a) and (b) is set to 100 parts by mass.

However, to ensure that the optical material obtained from this composition for optical material has enough strength, the amount of the compound (d) is set to at least 1% by mass or more, relative to the total mass of the composition for optical material.

(5) Compound (e)

The compound (e), which is a hindered amine intended to promote pre-polymerization reaction between the compound (a) and the compound (b), encompasses 1,2,2,6,6-pentamethylpiperidyl-4-methacrylate, bis(2,2,6,6-tetramethyl-4-piperidyl)sebacate, bis(1,2,2,6,6-pentamethyl-4-piperidyl)sebacate, bis(1,2,2,6,6-pentamethyl-4-piperidyl)-2-(3,5-di-tert-butyl-4-hydroxybenzyl)-2-n-butylmalonate, 1-methyl-8-(1,2,2,6,6-pentamethyl-4-piperidyl)-sebacate, 1-[2-[3-(3,5-di-tert-butyl-4-hydroxyphenyl)propionyloxy]ethyl]-4-[3-(3,5-di-tert-butyl-4-hydroxyphenyl)propionyloxy]-2,2,6,6-tetramethylpiperidine, 4-benzoyloxy-2,2,6,6-tetramethylpiperidine, tetrakis(2,2,6,6-tetramethyl-4-piperidyl)-1,2,3,4-butane-tetracarboxylate, triethylenediamine, 8-acetyl-3-dodecyl-7,7,9,9-tetramethyl-1,3,8-triazaspiro[4,5]decane-2,4-dione and so on, and one or more hindered amine compounds selected from these hindered amines may be used for this purpose. Among them, more preferred are 1,2,2,6,6-pentamethylpiperidyl-4-methacrylate represented by the following structural formula (Formula (6)) and bis(2,2,6,6-tetramethyl-4-piperidyl)sebacate, and particularly preferred is 1,2,2,6,6-pentamethylpiperidyl-4-methacrylate.

[Formula 6]

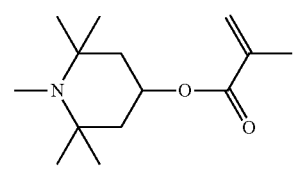

The amount of the compound (e) to be used in the present invention is 0.001 to 1 part by mass, preferably 0.002 to 1 part by mass, and more preferably 0.005 to 0.5 parts by mass, relative to the sum of the compounds (a) and (b) which is set to 100 parts by mass.

(6) Polymerization Catalyst

The composition for optical material of the present invention may optionally comprise a polymerization catalyst for polymerization and curing. Examples of a polymerization catalyst include amines, phosphines, quaternary ammonium salts, quaternary phosphonium salts, condensates between aldehydes and amine compounds, salts between carboxylic acids and ammonia, urethanes, thiourethanes, guanidines, thioureas, thiazoles, sulfenamides, thiurams, dithiocarbamate salts, xanthate salts, tertiary sulfonium salts, secondary iodonium salts, mineral acids, Lewis acids, organic acids, silicic acid and derivatives thereof, tetrafluoroboric acid and derivatives thereof, peroxides, azo compounds, acidic phosphate esters and so on.

The polymerization catalyst is not limited in any way as long as it drives polymerization and curing. Moreover, the polymerization catalysts listed above may be used either alone or in any combination. Among these, preferred specific examples include quaternary ammonium salts such as tetra-n-butyl ammonium bromide, triethyl benzyl ammonium chloride, cetyl dimethyl benzyl ammonium chloride, and 1-n-dodecyl pyridinium chloride, as well as quaternary phosphonium salts such as tetra-n-butyl phosphonium bromide, tetraphenyl phosphonium bromide and so on. Among these, more preferred specific examples are triethyl benzyl ammonium chloride and/or tetra-n-butyl phosphonium bromide, and the most preferred specific example is triethyl benzyl ammonium chloride.

The amount of the polymerization catalyst to be added is 0.001 to 5 parts by mass, preferably 0.002 to 5 parts by mass, and more preferably 0.005 to 3 parts by mass, relative to the sum of the compounds (a), (b), (c) and (d) which is set to 100 parts by mass.

(7) Polymerization Regulator

The composition for optical material of the present invention may optionally be supplemented with a polymerization regulator during polymerization and curing for the purpose of extending the pot life and/or dispersing the heat generated by polymerization, etc. Examples of such a polymerization regulator include halides of Group 13 to 16 elements in the long-form periodic table.

These polymerization regulators may be used either alone or in any combination. Among these, preferred are halides of silicon, germanium, tin and antimony. More preferred are chlorides of silicon, germanium, tin and antimony, and even more preferred are chlorides of germanium, tin and antimony, each having an alkyl group(s). Specific examples of the most preferred halides are dibutyltin dichloride, butyltin trichloride, dioctyltin dichloride, octyltin trichloride, dibutyldichlorogermanium, butyltrichlorogermanium, diphenyldichlorogermanium, phenyltrichlorogermanium, and triphenylantimony dichloride.

The amount of the polymerization regulator to be added is 0.001 to 5 parts by mass, preferably 0.002 to 5 parts by mass, and more preferably 0.005 to 3 parts by mass, relative to the sum of the compounds (a), (b), (c) and (d) which is set to 100 parts by mass.

(8) Performance Improver

The composition for optical material of the present invention may further comprise a compound (performance improver) capable of reacting with some or all of the constituent compounds for the purpose of improving a wide range of performance including oxidation resistance, weather resistance, dye affinity, strength, refractive index and so on. In this case, an additional known polymerization catalyst may be added for reaction, when required.

Examples of such a compound (performance improver) capable of reacting with some or all of the constituents include compounds having two or more mercapto groups except for the thiol compounds intended in the present invention, epoxy compounds, carboxylic acids, carboxylic acid anhydrides, phenols, amines, vinyl compounds, allyl compounds, acrylic compounds, methacrylic compounds and so on.

The amount of the performance improver to be added is 0.001 to 10 parts by mass, preferably 0.002 to 5 parts by mass, and more preferably 0.005 to 3 parts by mass, relative to the sum of the compounds (a), (b), (c) and (d) which is set to 100 parts by mass.

(9) Other Optional Components

In the composition for optical material of the present invention, it is of course possible to further improve the practicality of the resulting material by addition of various additives such as known antioxidants, bluing agents, UV absorbers and odor eliminators as optional components, when required.

Moreover, it is also possible to use any known external and/or internal adhesion improver if the optical material of the present invention is more likely to be released from the mold during polymerization, or alternatively, it is also possible to use any known external and/or internal mold release improver if the optical material of the present invention is less likely to be released from the mold during polymerization. Such an external and/or internal adhesion improver or external and/or internal mold release improver may be applied to a glass or metal mold which is to be used during polymerization and curing, or may also be effective when added to the composition for optical material of the present invention to thereby improve adhesion or release of the resulting optical material from the mold.

In the process of the present invention for preparing a composition for optical material, the amount of the compound (a) to be used is desirably 10% by mass or more relative to the total mass of the composition for optical material. Under conditions where the content of the compound (a) is 10% by mass or more relative to the total mass of the composition for optical material, high refractive index (particularly ne of 1.73 or higher) can be achieved.

Likewise, in terms of strength of the cured product, the content of the isocyanate compound (d) is required to be 1% by mass or more, and is desirably 2% by mass or more, relative to the total mass of the composition for optical material.

Moreover, the thiol compound (c) is required to ensure copolymerization with compound (d) and to improve the physical properties (e.g., color tone) of the cured product. For the reasons stated above, the content of the compound (c) is desirably 5% by mass or more, and more desirably 8% by mass or more, relative to the total mass of the composition for optical material.

In the process of the present invention for preparing a composition for optical material, the above compounds (a), (b), (c) and (d), as well as optional components which are used when required are mixed and stirred in a general manner, although the compounds (a) and (b) should be reacted, at least in part, for pre-polymerization using the compound (e) as a catalyst before being mixed with the compounds (c) and (d).

(i) Pre-Polymerization Reaction

To prepare the composition for optical material of the present invention, the compound (a) and the compound (b)

are reacted in advance for pre-polymerization using the compound (e) as a catalyst. The reaction mixture obtained by this pre-polymerization reaction contains the compound (a), the compound (b) and the pre-polymerization reaction product. The reaction mixture thus obtained is required to be mixed with the compound (c), the compound (d) and optional components. Pre-polymerization reaction between the compound (a) and the compound (b) serves as an effective means in handling the compound (a) which is in a solid state, and it ensures good transparency in the resulting optical material. Moreover, this allows incorporation of the compound (a) (i.e., an inorganic compound having sulfur or the like) at high content to thereby give a composition for optical material, which is capable of providing an optical material with high refractive index, high strength and high heat resistance.

How to effect pre-polymerization reaction between the compound (a) and the compound (b) will be described in detail below. The compound (a) and the compound (b) are reacted with each other, either in part or in whole, with stirring or without stirring. If the compound (a) or the compound (b) is provided in part for pre-polymerization reaction, the rest of the compound (a) or the compound (b) is separately added to and mixed with the resulting composition for optical material.

Although the percentage of pre-polymerization reaction is not limited in any way, the compound (a) and the compound (b) are preferably reacted for pre-polymerization to the extent that the compound (a) does not exists as a solid at the time of casting. More preferably, the compound (a) and the compound (b) are each provided in an amount of 50% to 100% by mass for pre-polymerization reaction, and particularly preferably their entire parts by mass are provide for pre-polymerization reaction.

In this case, the compound (e) is added, which serves as a pre-polymerization reaction catalyst for promoting the reaction between the compound (a) and the compound (b). The pre-polymerization reaction-catalyzing compound (e) used for this purpose is a hindered amine compound, preferably 1,2,2,6,6-pentamethylpiperidyl-4-methacrylate. The amount of the pre-polymerization reaction-catalyzing compound (e) to be added is 0.001 to 1 part by mass, preferably 0.002 to 1 part by mass, and more preferably 0.005 to 0.5 parts by mass, relative to the sum of the compounds (a) and (b) which is set to 100 parts by mass.

The pre-polymerization reaction may be effected under any atmosphere, e.g., in the presence of a gas such as air, nitrogen or oxygen, under sealed conditions at normal pressure or at increased or reduced pressure, or under reduced pressure, etc. Moreover, this pre-polymerization reaction may also be effected in the presence of various additives optionally used, including a polymerization regulator, a performance improver, a UV absorber, etc. Likewise, the pre-polymerization reaction may be effected in the presence of the compound (c), which is used in part or in whole, although the pre-polymerization reaction in this case corresponds to an embodiment where a portion of the polymerization and curing reaction is selectively carried out in advance. Thus, it is desired to control the reaction, e.g., by applying mild conditions.

The pre-polymerization reaction time is 1 minute to 72 hours, preferably 10 minutes to 48 hours, and more preferably 30 minutes to 24 hours. The pre-polymerization reaction temperature is 0° C. to 150° C., preferably 10° C. to 120° C., and more preferably 10° C. to 80° C.

Further, during this pre-polymerization reaction, the compound (a) has preferably been reacted by 10 mol % or more (assuming that the compound (a) before being subjected to the reaction is set to 100 mol %), and more preferably by 20 mol % or more.

In addition, the product of this pre-polymerization reaction may be analyzed by liquid chromatography and/or measured for viscosity and/or specific gravity and/or refractive index to thereby monitor and control the progress of the reaction, which is preferred in obtaining a homogeneous composition for optical material. Moreover, it is also possible to know the reaction rate of the compound (a).

Above all, preferred are liquid chromatography and/or refractive index measurement because of their high sensitivity, and more preferred is refractive index measurement because of its convenience. For refractive index measurement, an in-line type refractometer is preferred for use because the progress of the reaction can be monitored in real time.

(ii) Mixing

The method for producing a composition for optical material is as follows when described in detail. A reaction mixture containing the compound (a), the compound (b), and the pre-polymerization reaction product obtained by pre-polymerization reaction between the compound (a) and the compound (b), as well as the compound (c), the compound (d), the performance improver (i.e., a compound capable of reacting with some or all of the constituents), the pre-polymerization reaction-catalyzing compound (e), the polymerization catalyst, the polymerization regulator, various additives such as an adhesion improver or a mold release improver, an antioxidant, a bluing agent, a UV absorber, an odor eliminator and so on may all be mixed in the same vessel at the same time under stirring, or the starting materials may each be added and mixed stepwise, or some of the components may be mixed separately and then mixed again with the other components in the same vessel. The respective starting materials and additives and so on may be mixed in any order. Moreover, in addition to the above pre-polymerization reaction between the compound (a) and the compound (b), any other preliminary reaction may be performed on two or more of the respective components before mixing. For example, the compound (a) and the compound (b) may be reacted as above for pre-polymerization and, independently thereof, a portion of the compound (c) may be preliminarily reacted (but not merely mixed) with the performance improver, followed by mixing them together.

Mixing may be accomplished in principle under any conditions including the temperature and time required for this purpose, as long as the respective components are mixed well. However, excessive temperature and time are not proper, e.g., for the reason that they are more likely to cause undesirable reactions among the respective starting materials and additives, and further will cause an increase in viscosity to make the casting operation difficult in some cases.

The mixing temperature should be within the range of about −50° C. to 100° C., and a preferred temperature range is −30° C. to 70° C., more preferably −5° C. to 50° C. The mixing time is around 1 minute to 12 hours, preferably 5 minutes to 10 hours, and most preferably 5 minutes to 6 hours. When required, mixing may be accomplished by shielding active energy rays. Mixing may further be followed by degassing treatment in the manner described below.

(iii) Degassing Treatment

In the process of the present invention for preparing a composition for optical material, a resin composition is prepared by being mixed as above, and may then be subjected to degassing treatment. Degassing treatment performed on the composition for optical material prior to polymerization and curing is preferred in terms of achieving high transparency in the optical material obtained by polymerization and curing.

Degassing treatment is accomplished under reduced pressure before, during or after mixing of the compound (a), the compound (b), the compound (c), the compound (d), as well as the compound capable of reacting with some or all of the respective constituents, the polymerization catalyst, the polymerization regulator, and various additives. Preferably, degassing treatment is accomplished under reduced pressure during or after the mixing step.

Conditions for degassing treatment include a reduced pressure of 0.1 to 15000 Pa for 1 minute to 24 hours at 0° C. to 100° C. The degree of pressure reduction is preferably 1 to 10000 Pa, and more preferably 1 to 5000 Pa, although the degree of pressure reduction may vary within these ranges. The degassing time is preferably for 5 minutes to 18 hours, and more preferably 10 minutes to 12 hours. The temperature for degassing is preferably 5° C. to 80° C., and more preferably 10° C. to 60° C., although the temperature may vary within these ranges.

During degassing treatment, it is operationally preferred to renew the surface of the composition for optical material by stirring, gas blowing, ultrasonic vibration or other techniques, in terms of enhancing the degassing effect.

Components mainly removed by degassing treatment are dissolved gases (e.g., hydrogen sulfide), low-boiling substances (e.g., low molecular mercaptan) and so on, although such components are not limited in any way as long as degassing treatment produces an effect.

The thus obtained composition for optical material may be purified by being filtered through a filter or the like to remove impurities and others immediately before polymerization and curing. Purification of the composition for optical material by passing through a filter to remove impurities and others is desired in terms of ensuring a further increase in the quality of the optical material of the present invention. The filter used for this purpose has a pore size of about 0.05 to 10 μm, and filters with a pore size of 0.1 to 1.0 μm are commonly used. As materials for such filters, PTFE, PET, PP and the like are preferred for use.

2. Optical Material

The optical material of the present invention may be obtained by polymerizing and curing the composition for optical material obtained by the above method for producing a composition for optical material. Polymerization and curing are usually accomplished by injecting the composition for optical material into a glass or metal mold, followed by heating with an electric furnace or irradiation with UV or other active energy rays using an active energy ray generator, etc. The polymerization time ranges from 0.1 to 100 hours and is usually 1 to 48 hours, while the polymerization temperature ranges from −10° C. to 160° C. and is usually −10° C. to 140° C. Polymerization may be accomplished by holding at a given polymerization temperature for a given period of time, by increasing the temperature at a rate of 0.1° C. to 100° C./h, by decreasing the temperature at a rate of 0.1° C. to 100° C./h, or by any combination thereof.

In addition, after completion of the polymerization, the material may be annealed at a temperature of 50° C. to 150° C. for about 5 minutes to 5 hours, which is preferred for removing distortions from the optical material. Further, the material may optionally be subjected to surface treatment such as dyeing, hard coating, antireflection, antifogging, antifouling, impact resistance treatment, etc.

By polymerizing and curing the composition for optical material obtained by the preparation process of the present invention, it is possible to provide an optical material having not only sufficiently high refractive index and good Abbe's number, which have been difficult to achieve previously, but also high strength and heat resistance. Namely, it is possible to provide a composition for optical material which is capable of providing an optical material whose refractive index (ne) is preferably 1.73 or higher, and more preferably 1.74 or higher, whose strength expressed as an elongation in three-point bend test is 13% or more, preferably 14% or more, and particularly preferably 15% or more, along with good drilling resistance, and whose heat resistance (softening point as measured by TMA) is 70° C. or higher, and it is also possible to provide such an optical material and a rimless frame spectacle lens comprising the same.

In the present invention, a homogeneous composition for optical material can be obtained, which comprises sulfur serving as a refractive index improver in a large amount (e.g., 10% by mass or more relative to the total mass of the composition for optical material). Moreover, the resulting composition can be used to obtain an optical material having a refractive index as high as 1.73 or higher.

In prior art compositions consisting of the compound (a), the compound (b), the compound (c) and the compound (d) and processes for their preparation, rapid polymerization occurred when the compound (a) and the compound (d) were used in large amounts, so that no cured product (optical material) having a refractive index of 1.73 or higher was obtained.

According to the present invention, at the stage of preparing a composition for optical material, the compound (a) and the compound (b) have been consumed in appropriate amounts by being reacted for pre-polymerization using a hindered amine compound (e.g., 1,2,2,6,6-pentamethylpiperidyl-4-methacrylate) as a catalyst, whereby the compound (a) can be dissolved completely to thereby give a homogeneous liquid composition, and polymerization and curing can be effected without causing any rapid polymerization to thereby give a transparent and homogeneous optical material.

In this way, with the use of the characteristic composition and preparation process of the present invention, it is possible to easily obtain an optical material which achieves high refractive index (ne of 1.73 or higher) and further has high strength (an elongation of 13% or more in three-point bend test and good drilling resistance) and high heat resistance.

EXAMPLES

The present invention will be further described in more detail by way of the following illustrative examples, which are not intended to limit the scope of the present invention. It should be noted that the resulting optical materials were evaluated for their refractive index and Abbe's number, heat resistance, elongation, and drilling resistance in the following manner.

[Measurement of Refractive Index (ne) and Abbe's Number (vd)]

A digital high-precision refractometer (KPR-200, a product of Kalnew Optical Industrial Co., Ltd., Japan) was used to measure these parameters at 25° C.

[Measurement of Heat Resistance]

A sample was cut into 3 mm thickness and measured for its softening point by TMA (TMA/SS6100, a product of Seiko Instruments Inc., Japan) while applying a 10 g load to a pin of 1 mm diameter and increasing the temperature from 30° C. at a rate of 10° C./minute.

[Measurement of Elongation (Strength)]

In accordance with JIS K-7171, a strip of 2.5 mm thickness and 10.0 mm width was subjected to three-point bend test with an autograph (AG-5000B, a product of Shimadzu Corporation, Japan) at a span of 40 mm to measure an elongation at breakage.

[Drilling Resistance]

In accordance with the evaluation procedure described in JP 2008-101190 A, a plate of 2.5 mm thickness was drilled at a rotation rate of 2500 rpm and drilling speed of 600 mm/minute to make a hole of 2 mm diameter, and the surrounding area of the hole was observed for its state. A hole without any cracks in its surrounding area was evaluated as "good," while a hole with cracks in its surrounding area was evaluated as "poor."

Example 1

100 parts by mass in total of the compound (a) and the compound (b), i.e., 20 parts by mass of sulfur and 80 parts by mass of bis(β-epithiopropyl)sulfide (hereinafter referred to as compound b-1), respectively, were supplemented with 1 part by mass of 2-(2-hydroxy-5-tert-octylphenyl)benzotriazole as a UV absorber and mixed well at 50° C. into a homogeneous state. Then, 0.01 parts by mass of the pre-polymerization reaction-catalyzing compound (e), i.e., 1,2,2,6,6-pentamethylpiperidyl-4-methacrylate (hereinafter referred to as compound e-1) was added to effect pre-polymerization reaction at 50° C. until the compound (a) was no longer precipitated at 20° C.

In this example, it should be noted that the pre-polymerization reaction was stopped at a point where about 50 mol % of the compound (a) was reacted, and hence the resulting composition contains the compound (a) remaining in an unreacted state. The reaction rate of the compound (a) was determined by subjecting the reaction mixture to liquid chromatography analysis as well as refractive index measurement.

Subsequently, the resulting composition was cooled to 20° C. To the cooled composition, 0.035 parts by mass of triethyl benzyl ammonium chloride as a polymerization catalyst and 0.40 parts by mass of di-n-butyltin dichloride as a polymerization regulator, which had been dissolved in 9 parts by mass of the compound (c), i.e., m-xylylenedithiol (hereinafter referred to as compound c-1), were added as a master batch. Then, 3 parts by mass of the compound (d), i.e., m-xylylene diisocyanate (hereinafter referred to as compound d-1) was added and mixed to give a homogeneous composition, followed by degassing treatment under conditions of 4000 Pa for 60 minutes at 20° C.

The resulting composition for optical material was filtered through a 1.0 μm PTFE membrane filter, injected into a plate-shaped mold of 2.5 mm thickness which was constituted from two glass plates and a gasket, and heated at 30° C. for 10 hours, followed by increasing the temperature from 30° C. to 100° C. at a constant rate over 10 hours and finally heating at 100° C. for 1 hour to effect polymerization and curing. After cooling to room temperature, the mold was removed to obtain a cured optical material. The resulting optical material was evaluated for its refractive index and Abbe's number, heat resistance, elongation and drilling resistance, and the results obtained are shown in Table 1.

Examples 2 and 3

The same procedure as shown in Example 1 was repeated, except for changing the amounts of the compound (a) and the compound (b). The resulting optical materials were evaluated for their refractive index and Abbe's number, heat resistance, elongation and drilling resistance, and the results obtained are shown in Table 1.

Example 4

The same procedure as shown in Example 1 was repeated, except for changing the amounts of the compound (c) and the compound (d). The resulting optical material was evaluated for its refractive index and Abbe's number, heat resistance, elongation and drilling resistance, and the results obtained are shown in Table 1.

Example 5

The same procedure as shown in Example 1 was repeated, except for changing the amount of the compound (e) serving as a pre-polymerization reaction catalyst. The resulting optical material was evaluated for its refractive index and Abbe's number, heat resistance, elongation and drilling resistance, and the results obtained are shown in Table 1.

Example 6

The same procedure as shown in Example 1 was repeated, except for replacing compound b-1 used as the compound (b) with bis(β-epithiopropyl)disulfide (hereinafter referred to as compound b-2) and changing the amounts of the compounds (a) and (b). The resulting optical material was evaluated for its refractive index and Abbe's number, heat resistance, elongation and drilling resistance, and the results obtained are shown in Table 1.

Example 7

The same procedure as shown in Example 4 was repeated, except for replacing compound d-1 used as the compound (d) with 1,3-bis(1-isocyanate-1-methylethyl)-benzene (hereinafter referred to as compound d-2) and changing the amount of the compound (d). The resulting optical material was evaluated for its refractive index and Abbe's number, heat resistance, elongation and drilling resistance, and the results obtained are shown in Table 1.

Example 8

The same procedure as shown in Example 1 was repeated, except for replacing compound d-1 used as the compound (d) with 1,3-bis(isocyanatomethyl)cyclohexane (hereinafter referred to as compound d-3). The resulting optical material was evaluated for its refractive index and Abbe's number, heat resistance, elongation and drilling resistance, and the results obtained are shown in Table 1.

Example 9

The same procedure as shown in Example 1 was repeated, except for replacing compound c-1 used as the compound (c) with p-xylylenedithiol (hereinafter referred to as compound c-2). The resulting optical material was evaluated for its refractive index and Abbe's number, heat resistance, elongation and drilling resistance, and the results obtained are shown in Table 1.

Examples 10 and 11

The same procedure as shown in Example 1 was repeated, except for replacing the compound (c) with a combination of two members of the compound (c), e.g., a combination of compound c-1 and pentaerythritol tetrakis(3-mercaptopropionate) (hereinafter referred to as compound c-3) or a combination of compound c-1 and 1,2-bis(2-mercaptoethylthio)-3-mercaptopropane (hereinafter referred to as compound c-4) and chaining the amount of each compound. The resulting optical materials were evaluated for their refractive index and Abbe's number, heat resistance, elongation and drilling resistance, and the results obtained are shown in Table 1.

Example 12

The same procedure as shown in Example 1 was repeated, except for replacing compound e-1 used as the compound (e) with bis(2,2,6,6-tetramethyl-4-piperidyl)-sebacate (hereinafter referred to as compound e-2) and changing its amount to be used. The resulting optical material was evaluated for its refractive index and Abbe's number, heat resistance, elongation and drilling resistance, and the results obtained are shown in Table 1.

Comparative Example 1

100 parts by mass in total of the compound (a) and the compound (b), i.e., 15 parts by mass of sulfur and 85 parts by mass of compound b-1, respectively, were supplemented with 1 part by mass of 2-(2-hydroxy-5-tert-octylphenyl)benzotriazole as a UV absorber and mixed well at 60° C. into a homogeneous state. Then, 0.5 parts by mass of 2-mercapto-1-methylimidazole (hereinafter referred to as compound e-3) was added as a pre-polymerization reaction catalyst to effect pre-polymerization reaction at 50° C. until the compound (a) was no longer precipitated at 20° C. Subsequently, the resulting composition was cooled to 20° C. To the cooled composition, 0.03 parts by mass of triethyl benzyl ammonium chloride as a polymerization catalyst and 0.20 parts by mass of di-n-butyltin dichloride as a polymerization regulator were dissolved to effect polymerization and curing in the same manner as shown in Example 1. The resulting optical material was evaluated for its refractive index and Abbe's number, heat resistance and elongation, and the results obtained are shown in Table 1. The resulting optical material was not sufficient in its elongation and drilling resistance.

Comparative Example 2

100 parts by mass in total of the compound (a) and the compound (b), i.e., 16 parts by mass of sulfur and 84 parts by mass of compound b-1, respectively, were supplemented with 1 part by mass of 2-(2-hydroxy-5-tert-octylphenyl)benzotriazole as a UV absorber and mixed well at 60° C. into a homogeneous state. Then, 0.5 parts by mass of compound e-3 was added to effect pre-polymerization reaction at 60° C. until the compound (a) was no longer precipitated at 20° C. Subsequently, the resulting composition was cooled to 20° C. To the cooled composition, 0.03 parts by mass of triethyl benzyl ammonium chloride as a polymerization catalyst and 0.20 parts by mass of di-n-butyltin dichloride as a polymerization regulator, which had been dissolved in 7 parts by mass of compound c-1, were added as a master batch and mixed to give a homogeneous composition, followed by degassing treatment under conditions of 4000 Pa for 30 minutes at 20° C. The resulting composition was then polymerized and cured in the same manner as shown in Example 1 to obtain a cured optical material. The resulting optical material was evaluated for its refractive index and Abbe's number, heat resistance, elongation and drilling resistance, and the results obtained are shown in Table 1. The resulting optical material was not sufficient in its elongation.

Comparative Example 3

The same procedure as shown in Comparative Example 2 was repeated, except for replacing compound c-1 used as the compound (c) with bis(2-mercaptoethyl)sulfide (hereinafter referred to as compound c-5). The resulting optical material was evaluated for its refractive index and Abbe's number, heat resistance, elongation and drilling resistance, and the results obtained are shown in Table 1. The resulting optical material was not sufficient in its elongation and drilling resistance.

Comparative Example 4

100 parts by mass of compound b-1 as the compound (b), 16 parts by mass of compound c-1 as the compound (c), 0.005 parts by mass of polyoxyethylene lauryl ether sodium phosphate as an internal mold release agent, 0.03 parts by mass of tetra-n-butyl ammonium bromide as a polymerization catalyst, and 0.05 parts by mass of di-n-butyltin dichloride as a polymerization regulator were mixed to give a homogeneous composition, which was then degassed under reduced pressure of 1300 Pa for 30 minutes, followed by polymerization and curing in the same manner as shown in Example 1. The resulting optical material was evaluated for its refractive index and Abbe's number, heat resistance, elongation and drilling resistance, and the results obtained are shown in Table 1. The resulting optical material was not sufficient in its refractive index and heat resistance.

Comparative Examples 5 and 6

The same procedure as shown in Comparative Example 4 was repeated, except for changing the composition as indicated in Table 1. The resulting optical materials were evaluated for their refractive index and Abbe's number, heat resistance, elongation and drilling resistance, and the results obtained are shown in Table 1. The resulting optical materials were each found to have low refractive index and not sufficient in their elongation.

Comparative Example 7

The same procedure as shown in Comparative Example 4 was repeated, except for changing the composition as indicated in Table 1. As a result, polymerization and curing occurred in a state where the compound (a) remained undissolved, and no homogeneous and transparent optical material was obtained.

Comparative Example 8

The same procedure as shown in Comparative Example 2 was repeated to effect pre-polymerization reaction, and the resulting composition was cooled to 20° C. To the cooled composition, 0.03 parts by mass of triethyl benzyl ammonium chloride as a polymerization catalyst and 0.20 parts by mass of di-n-butyltin dichloride as a polymerization regulator, which had been dissolved in 9 parts by mass of compound c-1, were added as a master batch. Then, 3 parts by mass of compound d-1 was added and mixed. As a result, rapid polymerization occurred and no optical material was obtained.

recording substrates, filters, etc. Above all, it is preferred for use as a plastic lens, particularly a rimless frame spectacle lens.

The invention claimed is:

1. A method for producing a composition for optical material, starting from 10 to 50 parts by mass of the following compound (a) (provided that it is 10% by mass or more relative to the total mass of the composition for optical material), 50 to 90 parts by mass of the following compound

TABLE 1

| | Composition: parts by mass | | | | Pre-polymerization | Optical properties | | Heat resistance | Strength | |
|---|---|---|---|---|---|---|---|---|---|---|
| | Compound (a) | Compound (b) | Compound (c) | Compound (d) | reaction catalyst Compound (e) | ne | vd | (° C.) | Elongation (%) | Drill |
| Example 1 | 20 | b-1: 80 | c-1: 9 | d-1: 3 | e-1: 0.01 | 1.74 | 32 | 71 | 16 | Good |
| Example 2 | 18 | b-1: 82 | c-1: 9 | d-1: 3 | e-1: 0.01 | 1.74 | 32 | 70 | 17 | Good |
| Example 3 | 16 | b-1: 84 | c-1: 9 | d-1: 3 | e-1: 0.01 | 1.73 | 33 | 70 | 16 | Good |
| Example 4 | 20 | b-1: 80 | c-1: 10 | d-1: 4 | e-1: 0.01 | 1.73 | 32 | 70 | 17 | Good |
| Example 5 | 20 | b-1: 80 | c-1: 9 | d-1: 3 | e-1: 0.02 | 1.74 | 32 | 70 | 17 | Good |
| Example 6 | 12 | b-2: 88 | c-1: 9 | d-1: 3 | e-1: 0.01 | 1.74 | 32 | 71 | 16 | Good |
| Example 7 | 20 | b-1: 80 | c-1: 10 | d-2: 5 | e-1: 0.01 | 1.73 | 33 | 70 | 16 | Good |
| Example 8 | 20 | b-1: 80 | c-1: 9 | d-3: 3 | e-1: 0.01 | 1.73 | 32 | 71 | 15 | Good |
| Example 9 | 20 | b-1: 80 | c-2: 9 | d-1: 3 | e-1: 0.01 | 1.74 | 32 | 70 | 16 | Good |
| Example 10 | 21 | b-1: 79 | c-1: 7, c-3: 2 | d-1: 3 | e-1: 0.01 | 1.73 | 33 | 71 | 15 | Good |
| Example 11 | 20 | b-1: 80 | c-1: 7, c-4: 2 | d-1: 3 | e-1: 0.01 | 1.74 | 32 | 72 | 15 | Good |
| Example 12 | 20 | b-1: 80 | c-1: 9 | d-1: 3 | e-2: 0.05 | 1.74 | 32 | 71 | 15 | Good |
| Comparative Example 1 | 15 | b-1: 85 | — | — | e-3: 0.5 | 1.74 | 33 | 85 | 6 | Poor |
| Comparative Example 2 | 16 | b-1: 84 | c-1: 7 | — | e-3: 0.5 | 1.74 | 32 | 71 | 12 | Good |
| Comparative Example 3 | 16 | b-1: 84 | c-5: 7 | — | e-3: 0.5 | 1.74 | 32 | 70 | 9 | Poor |
| Comparative Example 4 | — | b-1: 100 | c-1: 16 | — | No pre-polymerization reaction | 1.71 | 34 | 68 | 10 | Good |
| Comparative Example 5 | — | b-1: 100 | c-1: 16 | d-2: 12 | No pre-polymerization reaction | 1.70 | 34 | 73 | 11 | Good |
| Comparative Example 6 | 4 | b-1: 96 | c-5: 15 | d-2: 12 | No pre-polymerization reaction | 1.71 | 33 | 71 | 10 | Good |
| Comparative Example 7 | 10 | b-1: 90 | c-1: 9 | d-1: 3 | No pre-polymerization reaction | No homogeneous optical material was obtained because the compound (a) remained undissolved | | | | |
| Comparative Example 8 | 16 | b-1: 84 | c-1: 9 | d-1: 3 | e-3: 0.5 | No cured product was obtained because rapid polymerization occurred | | | | |

It should be noted that the symbols appearing in Table 1 above have the following meanings.
(a) sulfur
(b-1) bis(β-epithiopropyl)sulfide
(b-2) bis(β-epithiopropyl)disulfide
(c-1) m-xylylenedithiol
(c-2) p-xylylenedithiol
(c-3) pentaerythritol tetrakis(3-mercaptopropionate)
(c-4) 1,2-bis(2-mercaptoethylthio)-3-mercaptopropane
(c-5) bis(2-mercaptoethyl)sulfide
(d-1) m-xylylene diisocyanate
(d-2) 1,3-bis(1-isocyanate-1-methylethyl)benzene
(d-3) 1,3-bis(isocyanatomethyl)cyclohexane
(e-1) 1,2,2,6,6-pentamethylpiperidyl-4-methacrylate
(e-2) bis(2,2,6,6-tetramethyl-4-piperidyl)sebacate
(e-3) 2-mercapto-1-methylimidazole

INDUSTRIAL APPLICABILITY

The composition for optical material obtainable by the preparation process of the present invention can provide an optical material having excellent properties such as high refractive index, high strength and high heat resistance upon polymerization and curing. The thus obtained optical material of the present invention is preferred as an optical material for plastic lenses, prisms, optical fibers, information (b), 1 to 50 parts by mass of the following compound (c), and 1 to 50 parts by mass of the following compound (d) (provided that it is 1% by mass or more relative to the total mass of the composition for optical material) (provided that all parts by mass are calculated assuming that the sum of the compound (a) and the compound (b) is set to 100 parts by mass), wherein the method comprises a pre-polymerization reaction between the following compound (a) and the following compound (b) using a hindered amine as a catalyst, and mixing the resulting reaction mixture with the following compound (c) and the following compound (d):
  (a) an inorganic compound having a sulfur atom;
  (b) an episulfide compound having one or more episulfide groups per molecule;
  (c) a thiol compound having one or more mercapto groups per molecule; and
  (d) an isocyanate compound having one or more isocyanate groups per molecule;
wherein compound (a) and compound (b) are substantially completely provided and substantially completely reacted in the pre-polymerization reaction.

2. The method for producing a composition for optical material according to claim 1, wherein the hindered amine is 1,2,2,6,6-pentamethylpiperidyl-4-methacrylate.

3. A method for producing an optical material, which comprises the steps of: preparing a composition for optical material by the methods for producing a composition for optical material according to claim 1, and polymerizing and curing the resulting composition for optical material.

4. An optical material obtainable by the method according to claim 3, which has a refractive index (ne) of 1.73 or higher.

5. A spectacle lens, which comprises the optical material according to claim 4.

6. The spectacle lens according to claim 5, which has enough strength to be applicable to a rimless frame.

* * * * *